United States Patent
Honnefeller et al.

(10) Patent No.: US 8,414,817 B2
(45) Date of Patent: Apr. 9, 2013

(54) PROCESS FOR MANUFACTURING A HAIRBRUSH BRISTLE

(75) Inventors: Katja Honnefeller, Friedrichsdorf (DE); Jürgen Seng, Kelkheim (DE); Michael Klöppel-Riech, Friedberg (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 12/742,535

(22) PCT Filed: Nov. 26, 2008

(86) PCT No.: PCT/EP2008/009994
§ 371 (c)(1),
(2), (4) Date: May 12, 2010

(87) PCT Pub. No.: WO2009/071224
PCT Pub. Date: Jun. 11, 2009

(65) Prior Publication Data
US 2010/0269841 A1 Oct. 28, 2010

(30) Foreign Application Priority Data

Dec. 6, 2007 (DE) .......................... 10 2007 059 015

(51) Int. Cl.
*B29C 45/00* (2006.01)
(52) U.S. Cl. .................. 264/328.1; 264/318; 264/296; 264/334; 264/293
(58) Field of Classification Search .......................... None
See application file for complete search history.

(56) References Cited

U.S. PATENT DOCUMENTS 2,621,369 A * 12/1952 Gantz et al. ..................... 29/469
2,651,810 A * 9/1953 Snyder .......................... 264/519
(Continued)

FOREIGN PATENT DOCUMENTS

DE 2155888 11/1970
DE 3400941 1/1983
(Continued)

*Primary Examiner* — Edmund H. Lee
(74) *Attorney, Agent, or Firm* — Kim William Zerby

(57) ABSTRACT

The invention relates to a hairbrush (40), bristles (10) for use in a hairbrush, and method for the production of a hairbrush and such bristles. Particularly, the invention discloses a method for producing a brush in which moldable material is placed in a multi-part, separatable mold tool and a bristle is produced having a bristle foot (16) and a bristle shaft (14), wherein a bristle shaft blank (12) is molded using a first molding jaw (30), wherein moldable material is placed in a mold hollow space (36) of the first molding jaw and removed from the mold hollow space of the first molding jaw, wherein the mold hollow space of the first molding jaw is maintained and the bristle foot is molded in a second molding jaw (32) and a third molding jaw (34), wherein the second and third molding jaws together form a second mold hollow space (38), the shape of which substantially corresponds to the shape of the bristle foot to be formed, and the second mold hollow space is filled with the moldable material and the first and second molding jaws are separated.

21 Claims, 3 Drawing Sheets

U.S. PATENT DOCUMENTS

Figure 1:
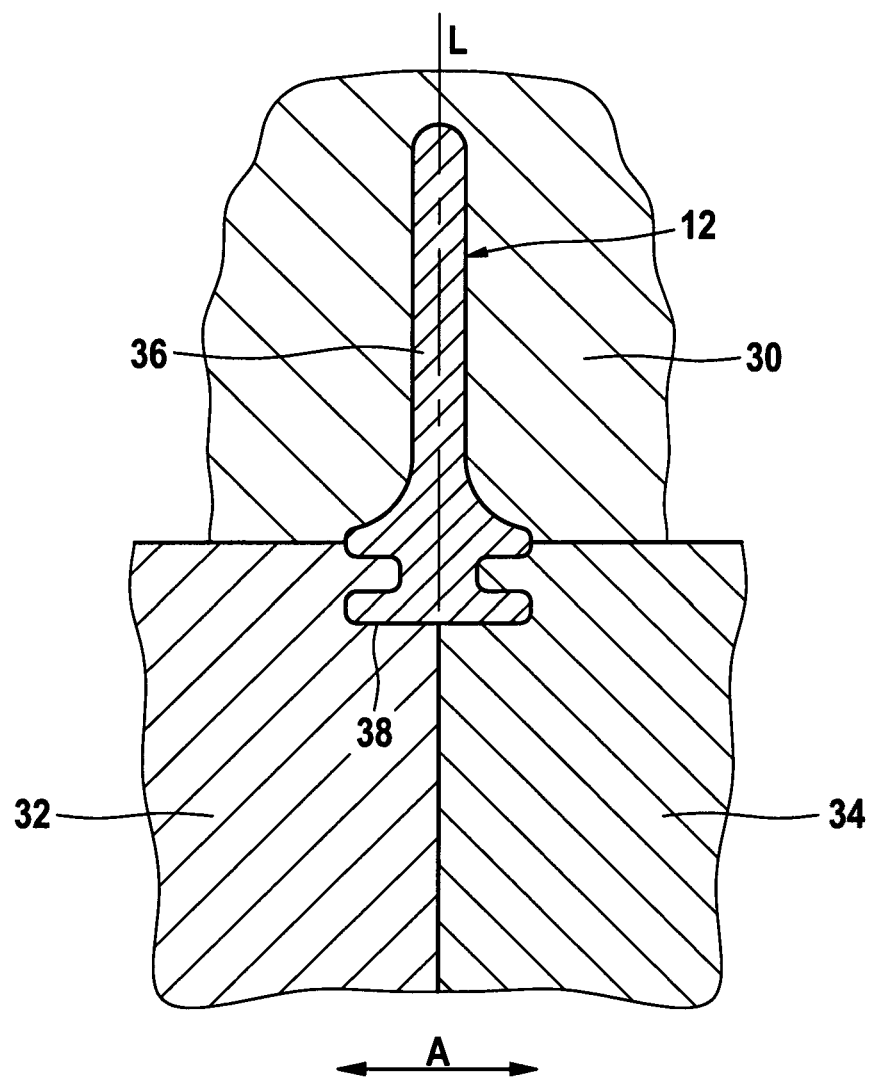

| | | | | |
|---|---|---|---|---|
| 3,577,843 | A * | 5/1971 | Kutik et al. | 425/547 |
| 3,781,402 | A * | 12/1973 | Hanggi | 264/243 |
| 4,244,076 | A * | 1/1981 | Meyer | 15/188 |
| 4,422,986 | A * | 12/1983 | Cole | 264/39 |
| 4,603,831 | A | 8/1986 | Krishnakumar | |
| 5,352,025 | A * | 10/1994 | Huang | 300/21 |
| 5,490,966 | A | 2/1996 | Peterson | |
| 5,531,582 | A * | 7/1996 | Klinkhammer | 425/190 |
| 5,771,904 | A | 6/1998 | Lange | |
| 6,638,384 | B1 | 10/2003 | Edwards et al. | |
| 6,767,494 | B1 | 7/2004 | Robinson | |
| 7,226,555 | B2 * | 6/2007 | Weihrauch | 264/163 |
| 7,294,297 | B2 | 11/2007 | Weihrauch | |
| 7,419,626 | B2 * | 9/2008 | Mark | 264/243 |
| 7,644,466 | B2 | 1/2010 | Weihrauch | |
| 7,951,320 | B1 | 5/2011 | Swanson | |
| 2003/0163884 | A1 * | 9/2003 | Weihrauch | 15/207.2 |
| 2010/0282268 | A1 | 11/2010 | Honnefeller | |

FOREIGN PATENT DOCUMENTS

| | | |
|---|---|---|
| EP | 1491113 | 6/2003 |
| GB | 622532 | 3/1947 |
| GB | 601371 | 5/1948 |
| JP | 60-129069 | 2/1984 |
| JP | 61115536 | 11/1984 |
| JP | 3009262 | 3/1991 |
| JP | 05-146311 | 11/1991 |
| JP | 3008320 | 6/1992 |
| JP | 06-154027 | 11/1992 |
| JP | 6190418 | 12/1992 |
| JP | 6239531 | 2/1993 |
| JP | 10108732 | 10/1996 |
| JP | 3099422 | 7/2003 |
| JP | 200455351 | 2/2004 |
| JP | 2005238642 | 2/2004 |
| JP | 443129 | 1/2012 |

* cited by examiner

PROCESS FOR MANUFACTURING A HAIRBRUSH BRISTLE

The invention relates to a hairbrush, bristles for use in a hairbrush, and method for the manufacture of a hairbrush and such bristles. The invention can be used in a number of very different hairbrushes. The bristles described here could even be used in brushes not intended for or not primarily intended for brushing hair. Using the bristles in massage brushes would also be particularly suitable. Another suitable application would be to use of the bristles in a hair-care device that also heats the hair, either via warm air or a warm contact surface. Such devices are marketed as stylers or curlers.

GB 601.371 (Denman) discloses a hairbrush with non-metallic bristles. The bristles taper toward the tip and have a bristle foot that serves to anchor the bristles firmly in a rubber mat, whereby the bristles are inserted tip first through openings in the mat and the body of the brush is used to apply pressure to the bristle feet from the side facing the brush.

A process for manufacturing bristles is known from DE 2155888. Disclosed in this patent is a multi-part, separable mold tool for molding a bristle with a bristle foot and bristle shaft. This process makes it possible, at least in theory, to produce smooth bristle shafts, but requires a highly involved elongation process and a complex mold tool. Despite the complexity of the mold tool, however, it does not allow operators to select the shape of the bristle foot; in particular, the tool cannot be used to manufacture a bristle foot with an undercut.

The purpose of the present invention is to provide bristles, brushes and methods for the production thereof that represent an improvement over the state of the art. The bristles and brushes should be especially gentle to hair and the scalp. The manufacturing processes are to be cost efficient, suitable for mass production, and produce little waste. In particular, the processes are to result in safe, gentle bristles and brushes, even when production standards are less than perfect.

These demands are met by a process for manufacturing a bristle according to Claim 1, by a process for manufacturing a brush according to Claim 10 and by a bristle according to Claim 11 or 12, as well as by a hairbrush according to Claim 14. Preferred designs, which meet these demands especially well, are described in the subclaims.

The use of a multi-part, separable mold tool makes it possible to provide optimum hollow spaces in the mold for various bristle components. The bristle shaft blank is formed in the hollow space of a separate mold tool. This is done by drawing moldable material into the mold tool, which generally has an air outlet channel opposite the filler hole. The hollow space in the mold typically tapers away from the filler hole, i.e., the cross-section of the hollow space is smaller at a position farther away from the filler hole. It follows that the bristle shaft blank is molded in such a way that the part that will become the tip of the bristle is formed at the end of the hollow space opposite the filler hole.

The present invention is suitable for molding bristles made from all commonly used moldable materials, i.e., all suitable plastics and polyamides in particular. Aliphatic polyamides are used preferably, especially those commercially available in the form of nylon. Aliphatic polyamides of this type are relatively impervious to heat, which makes it possible to use the bristles in a hairbrush while the hair is being heated by a device such as a hair dryer.

In particular, the preferred polyamides are known to have a slight tendency to form ridges, however, as they can be processed especially well in multi-part mold tools. When the bristle shaft is ejected from the mold, in other words, ridges will result if the corresponding hollow space is formed in a two-part or multi-part mold tool. A ridge of this type on the bristle shaft damages hair, however, and also serves as a place where dirt can easily collect. The result is hairbrush that is neither very hygienic nor very gentle.

One conceivable solution would be to process the bristle shaft after molding, e.g., by deburring. Treating molded bristle shafts with abrasives represents one deburring option. This is a time-consuming, expensive process, however, and can increase roughness along the remaining portions of the bristle. The bristle shaft could also be frozen as either an alternative or as an additional deburring method. The aliphatic polyamide material is very tough, and freezing makes it easier to debur. This step is clearly costly as well, however.

The present process calls for the bristle foot to be molded with two molding jaws that together form a hollow space. This hollow space, which is bounded by two molding jaws, largely corresponds to the shape of the bristle foot to be molded. The space is filled with the moldable material and the two molding jaws are then separated.

The bristle foot is generally made from the same moldable material as the bristle shaft. The hollow spaces for the bristle shaft and bristle foot form a combined hollow space that is filled with moldable material in a single step. The bristle shaft and foot could also conceivably be molded from different materials.

If using a three-part mold tool, the bristle shaft can be removed from its molding jaw by moving this tool along the axis of the resulting bristle, away from the molding jaws containing the bristle foot. The two molding jaws containing the bristle foot can then be separated. Moving the molding jaws in this way serves as a simple means of removing the bristle with no additional equipment required.

Elongating the bristle shaft may also be suitable, either instead of or in addition to the process described above. In this case, the final shape of the bristle shaft blank will differ from that of the hollow space in which it was first molded. The bristle shaft blank can be elongated by moving the third molding jaw relative to the first and/or second jaw, provided this movement is performed along the longitudinal axis of the bristle shaft being produced.

Elongation is not a required process step, and, as such, processes in which the bristle shaft retains essentially the same shape as the bristle shaft blank are likewise in accordance with this invention. The bristle shaft and bristle shaft blank, as well as the bristle and bristle blank can therefore be generally used interchangeably within the scope of this invention.

It should be noted that brushes are inexpensive items that consumers need on a daily basis and routinely purchase new. It follows that a brush should not be overly expensive. The enormous number of bristles involved makes it especially important that the mass production process used be economical. Separable mold tools that combine to form a single hollow space regularly leave a small ridge along the dividing line. This ridge is very small if the mold tools used are new and of high quality. An economical mass production process, however, also requires the use of economical mold tools for a certain operating life. This causes significant ridges, which, when used in a hairbrush, have the disadvantages described above.

Molding the bristle shaft and bristle foot together in a single mold tool is likewise not without its challenges, however. The bristle shaft then has to be tapered along its entire length, as does the bristle foot, rendering it impossible to produce a complex bristle shape. A simple bristle shape, as is known from GB 601.371 (Denman), results in certain additional demands on the brush, however. Denman discloses a relatively complex brush body in which the entire bristle surface is supported. While the bristles can bend to the side, they cannot be pushed down toward the brush along their longitudinal axis. The ability to move down in this way, i.e., to provide a cushioning effect, is significantly gentler on the scalp in brushes used as hairbrushes.

This cushioning effect of the bristles can be achieved with an undercut on the bristle foot, whereby the undercut can be used for mounting the bristle foot both above and below a support material.

This support material can, for instance, be an elastic rubber mat that has been inserted into the brush body in such a way as to pretension it and lend it elastic qualities. This rubber mat then gives spring-elastic properties to each inserted bristle. Bristles can bend down along their longitudinal axis (and their spring-elastic properties then allow them to be pressed back in the direction of the hair) and can also give way in any axial direction. The ability to design a bristle foot with a complex shape therefore corresponds to the ability to manufacture gentle brushes.

The process for manufacturing a bristle can comprise still other steps. Particularly suitable in this regard would be additional processing performed on the profile of the bristle shaft blank. Processing of this type can consist of dyeing, grinding, smoothing or polishing the bristle shaft blank. Processing the bristle shaft blank in the head area is also particularly suitable.

The process disclosed here can include a step for rounding the head of the bristle shaft blank. "Rounding" in this case refers to a process in which the profile of the head thickens with respect to the shaft below the bristle head, whereby the axial cross-section may, for instance, increase from the bristle shaft to the head at least one point, whereby the axial cross-section may first increase at least one point and then decrease at least one subsequent point. A spherical or at least rounded head shape is well suited to this purpose.

The bristle head may be rounded mechanically or by means of a non-contact process, but must generally be heated first. Any known thermal processes may be applied for heating, including hot deformation processes. Particularly suitable would be a process in which the head of the bristle shaft blank is inserted into a heated molding element that molds the head shape onto the blank. Also conceivable are non-contact thermal processes that utilize the influence of cohesive forces or gravity to give the bristle shaft blank (at least in the heated head area) a rounded shape. This kind of rounded shape likewise results in gentler bristles, because the contact surface of the bristles is larger and the contact profile has no edges.

The process can also be used to advantage when manufacturing at least one bristle with a foot, shaft and head, each having a different profile, whereby the bristle foot has an undercut, the bristle shaft is free of ridges and the bristle head is rounded.

Also suitable would be the application of an encapsulating material to the bristle head in an additional processing step. Particularly suitable would be the application of a varnish to the bristle head, e.g., in the form of a droplet, which would thicken and round the bristle head.

Varnishing the ends of bristles in this way is known. After prolonged use, however, the encapsulating material routinely falls off of the bristle. For this reason, a process step is suggested in which the shape of bristle head is modified before applying the encapsulating material. The rounding process described above would be suitable for this purpose. Widening the profile of the bristle head would also be a suitable means of better anchoring the encapsulating material. The end of the bristle could, for instance, be shaped like a plate, whereby the bristle would have a T-shaped cross-section.

The process for manufacturing bristles can be part of a manufacturing process for brushes. A suitable brush manufacturing process would be one in which the bristles are manufactured by means of a process according to one of the foregoing claims, wherein the bristles (and bristle feet) are inserted in a bristle support pad, which, in turn, is inserted in a brush.

A hairbrush manufactured according to one of the processes described here can also comprise addition hair-treatment devices. A particularly suitable brush would be one which also comprises an ion applicator. An ion applicator of this type can counteract the hair's static charge. Because hair typically acquires a positive charge, applying negative ions to the hair is helpful. An ion applicator of this type can run on batteries from an electrical outlet. A battery-powered applicator for negative ions would be suitable for an especially gentle, convenient hair brush.

These and other features of the invention follow not only from the claims, but also from the subsequent description and/or corresponding drawings, whereby the object of the invention may comprise the individual features either in a variety of combinations or subcombinations, or in isolation regardless of how they are combined in the claims. Examples of preferred designs and corresponding drawings are given in the following to define the invention in greater detail. The drawings show the following:

FIG. 1: A longitudinal cross-section through the mold tool taken along the center longitudinal axis of a bristle FIG. 2: A longitudinal cross-section through the bristle according to this invention FIG. 3: A longitudinal cross-section through another bristle according to this invention, whereby the head of this bristle is encapsulated FIG. 4: A transverse cross-section through a brush FIG. 1 shows a longitudinal cross-section of a bristle (10). The longitudinal cross-section was selected along the longitudinal axis (L) of the bristle. The bristle shaft blank (12), having a bristle shaft (14), a bristle foot (16) and a bristle head (18), is visible here. The bristle shaft blank is formed in the hollow space (36) of the first molding jaw (30). The second molding jaw (32) and the third molding jaw (34) form the hollow space (38) in which the bristle foot (16) is formed. The bristle shaft blank can be removed from the molding jaws by moving the first molding jaw (30) along the longitudinal axis (L), i.e., upwards as shown in FIG. 1. The second and third molding jaws are then pulled apart in a direction perpendicular to the longitudinal axis (L), as indicated by the left-right arrow (A).

Figure 2:
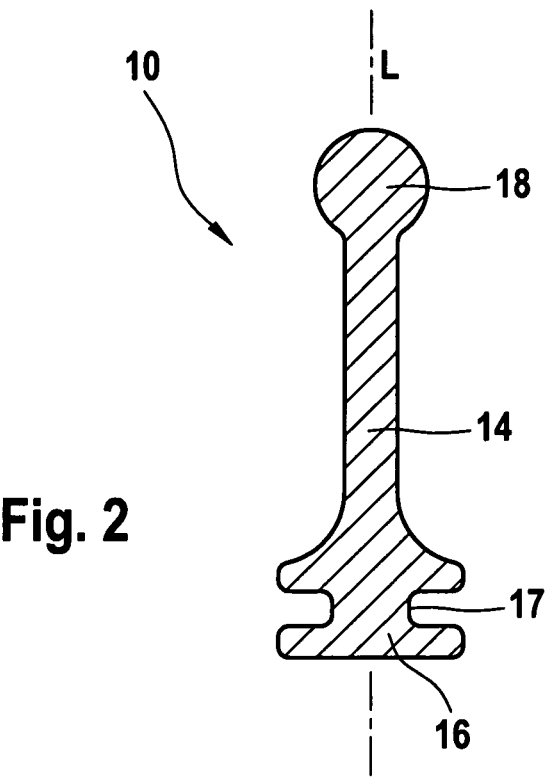

FIG. 2 shows a bristle (10) that can be manufactured according to the process disclosed here. The shaft (14) of the bristle (10) is free of ridges and is bounded above by a bristle head (18) and below by the bristle foot (16). The bristle shaft (14) tapers from the bristle foot (16) toward the bristle head (18). The bristle foot (16) has an undercut (17). This undercut can be used to anchor the bristle (10) in a bristle support. The bristle head (18) is rounded in such a way that the transverse cross-sections of the bristle head (18) between the bristle shaft and the end of the bristle at first increase and then decrease. The profile of the bristle head is largely symmetrical with respect to the longitudinal axis (L) of the bristle.

Figure 3:
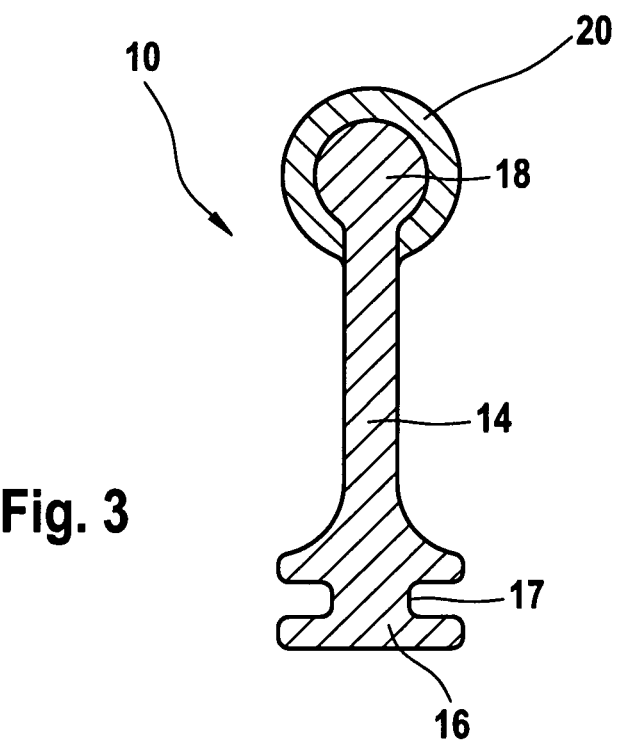

FIG. 3 shows a different bristle. The shape of this bristle largely corresponds to that of the bristle in FIG. 2. An encapsulating material (20) has been added to the bristle head (18), however. Rounding the bristle head (18) results in a head that is thicker than the bristle shaft (14), a feature ensuring that the encapsulating material will hold in place.

Figure 4:
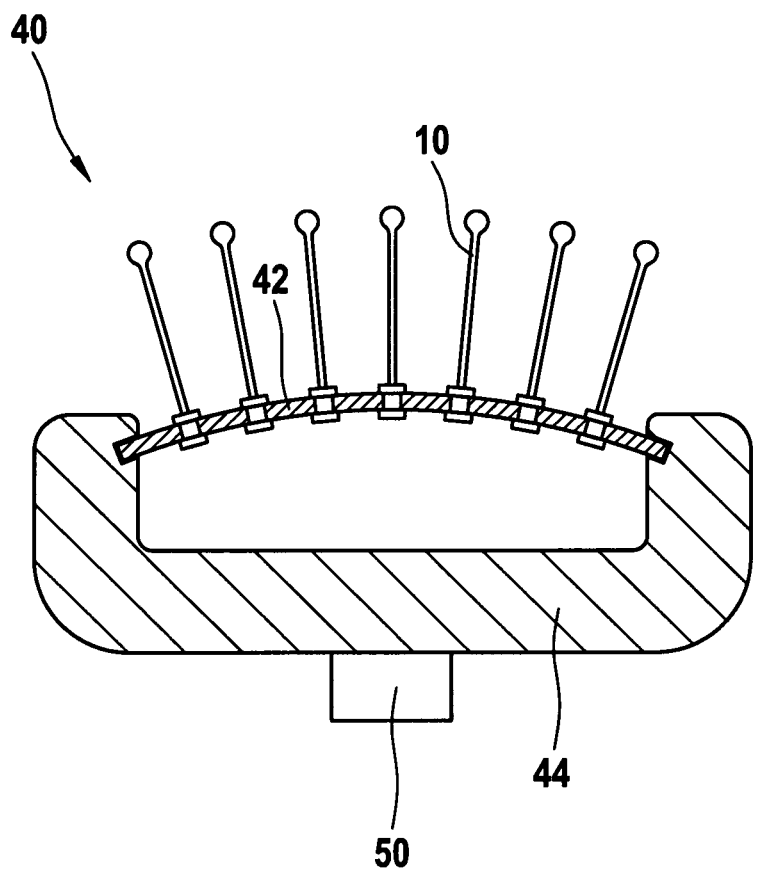

FIG. 4 shows a transverse cross-section of a brush, whereby the cross-section is taken through the bristle field of the brush (40). This cross-section shows the bristle support (42) and the brush body (44), into which the bristle support (42) is recessed. The bristle support (42) can inserted in such a way as to pretension it and lend it elastic qualities, so that the bristles (10) mounted in the bristle support (42) have spring-elastic properties with respect to the bristle (sic) body (44). The bristles (10) can move toward the brush body (44) along their respective longitudinal axes and then spring back, e.g., toward the hair. Furthermore, they can also move in an axial direction as well.

The brush shown here (40) also includes an ion applicator. The ion applicator is affixed to the back side of the brush body, i.e., on the side facing away from the bristle support (42).

What is claimed is:

1. A process for manufacturing a bristle (10) for use in a hairbrush (40), in which moldable material is introduced into a multi-part, separable mold tool to produce a bristle (10) with a bristle foot (16) and a bristle shaft (14), said process comprising a bristle shaft blank (12) is formed using an initial molding jaw (30), wherein moldable material is introduced into a hollow space (36) in this first molding jaw (30) and subsequently removed from the hollow space (36) in the first molding jaw (36), wherein the hollow space (36) in the first molding jaw (30) remains intact and the bristle foot (16) is formed in a second molding jaw (32) and a third molding jaw (34), wherein the second and third molding jaws together define a second hollow space (38), the shape of which largely corresponds to the bristle foot (16) to be created, and the second hollow space (38) is filled with the moldable material and the second and third molding jaws are subsequently separated.

2. A process according to claim 1, in which the shape of the bristle shaft (14) formed from the bristle shaft blank (12) is different, whereby the shape of bristle shaft (14) arises at least in part from elongating the bristle shaft blank (12), wherein elongation is accomplished by moving the first molding jaw (30) relative to the second and/or third molding jaw and this relative motion is performed along the longitudinal axis (L) of the bristle shaft to be produced.

3. A process according to claim 1, in which the shape of the bristle shaft (14) is largely the same as that of the bristle shaft blank (12).

4. A process according to claim 1 in which the profile of the bristle shaft blank (12) undergoes additional processing.

5. A process according to claim 4, in which the profile of the bristle shaft blank (12) is processed in the head area of the bristle shaft blank.

6. A process according to claim 5, in which the profile of the bristle shaft blank is rounded in the head area.

7. A process according to claim 4, in which the profile is subjected to further thermal processing.

8. A process according to claim 7, in which the profile is subjected to a hot deformation procedure.

9. A process according to claim 8, in which the profile is subjected to a non-contact, hot deformation procedure.

10. A process according to claim 2, in which the profile of the bristle shaft blank (12) undergoes additional processing.

11. A process according to claim 3, in which the profile of the bristle shaft blank (12) undergoes additional processing.

12. A process according to claim 10, in which the profile of the bristle shaft blank (12) is processed in the head area of the bristle shaft blank.

13. A process according to claim 11, in which the profile of the bristle shaft blank (12) is processed in the head area of the bristle shaft blank.

14. A process according to claim 12, in which the profile of the bristle shaft blank is rounded in the head area.

15. A process according to claim 13, in which the profile of the bristle shaft blank is rounded in the head area.

16. A process according to claim 10, in which the profile is subjected to further thermal processing.

17. A process according to claim 11, in which the profile is subjected to further thermal processing.

18. A process according to claim 16, in which the profile is subjected to a hot deformation procedure.

19. A process according to claim 17, in which the profile is subjected to a hot deformation procedure.

20. A process according to claim 18, in which the profile is subjected to a non-contact, hot deformation procedure.

21. A process according to claim 19, in which the profile is subjected to a non-contact, hot deformation procedure.

* * * * *